United States Patent
Fujinaga (10) Patent No.: US 7,334,242 B2
(45) Date of Patent: Feb. 19, 2008

(54) METHOD AND DEVICE FOR EJECTING DISC

(75) Inventor: Ken Fujinaga, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 556 days.

(21) Appl. No.: 11/058,087

(22) Filed: Feb. 15, 2005

(65) Prior Publication Data

US 2005/0188388 A1  Aug. 25, 2005

(30) Foreign Application Priority Data

Feb. 17, 2004  (JP)  ............................. 2004-040240

(51) Int. Cl.
*G11B 17/04* (2006.01)

(52) U.S. Cl. .................................................. 720/626

(58) Field of Classification Search ................ 720/626, 720/632, 633, 636, 637, 638, 645; 360/99.02, 360/99.03, 99.04, 99.06, 99.07; 369/30.85
See application file for complete search history.

(56) References Cited

U.S. PATENT DOCUMENTS

| | | | | |
|---|---|---|---|---|
| 5,739,519 A | * | 4/1998 | Tsuchiya | 235/456 |
| 6,091,684 A | * | 7/2000 | Schell | 369/53.3 |
| 6,515,951 B1 | | 2/2003 | Oh | |
| 6,785,898 B1 | * | 8/2004 | Nakamichi | 720/621 |
| 2003/0156508 A1 | * | 8/2003 | Ohyama et al. | 369/30.85 |
| 2005/0086674 A1 | * | 4/2005 | Makisaka et al. | 720/626 |

FOREIGN PATENT DOCUMENTS

JP  2001-236711  8/2001

* cited by examiner

*Primary Examiner*—Tianjie Chen
(74) *Attorney, Agent, or Firm*—Brinks Hofer Gilson & Lione (57) ABSTRACT

A method for ejecting a disc includes the steps of conveying a disc back to a disc-holding position on a rotator by conveyor pulleys if an error occurs in an ejecting process of the disc, and subsequently performing a retry operation of the ejecting process. Specifically, the disc conveyed back to the disc-holding position is rotated by the rotator before restarting the ejecting process.

10 Claims, 8 Drawing Sheets

METHOD AND DEVICE FOR EJECTING DISC

BACKGROUND OF THE INVENTION

1. Technical Field

The present invention relates to methods and devices for ejecting discs, and particularly, to a method and a device for ejecting a disc in which a disc in a disc apparatus is properly conveyed to a disc-ejecting position via a disc-conveying unit.

2. Description of the Related Art

Conventionally, in-vehicle and home disc apparatuses, such as car navigation systems and music players, have been used for playing back image data or audio data recorded on a disc, or recording image data or audio data onto a disc.

In such disc apparatuses, a disc is held and rotated by a rotator disposed in the disc apparatus while an optical head is used to play back data from or record data onto the disc.

Furthermore, such disc apparatuses are provided with a disc-ejecting device for ejecting the disc from the disc apparatus. In detail, the disc-ejecting device conveys the disc in the disc apparatus to a disc-ejecting position where the disc can be pulled outward from the disc apparatus, namely, a position where the disc is exposed through an opening provided in the disc apparatus.

Japanese Unexamined Patent Application Publication No. 2003-217220, for example, discloses a conventional example of a method and a device for ejecting a disc.

Such a disc-ejecting device is provided with a disc-conveying unit for conveying the disc between a disc-holding position corresponding to a rotator and the disc-ejecting position. The disc-conveying unit includes a rotary member, such as a conveying roller or a conveyor pulley, which comes into contact with the disc. The rotary member rotates in the ejecting direction of the disc so as to convey the disc to the disc-ejecting position.

The disc-conveying unit is rotated by a driving source, such as a motor, and the driving source is controlled by a controller provided in the disc-ejecting device.

The controller is electrically connected with an eject button by which a user can enter a command signal for disc-ejection. When the eject button is pressed, the controller starts a control operation for rotating the disc-conveying unit in the ejecting direction.

Furthermore, in the conventional disc-ejecting device, if a disc is not properly ejected from the disc apparatus, the disc is conveyed back to the disc-holding position, and subsequently, a retry operation for restarting the ejecting process of the disc is performed.

In order to achieve this, the disc-ejecting device is provided with a detector, such as an optical sensor, for detecting whether the disc has been conveyed to the disc-ejecting position. The detection result by the detector is provided to the controller.

Moreover, the disc-ejecting device is also provided with a timer for measuring the elapsed time from the start of the ejecting process of the disc performed by the disc-conveying unit.

If the detector does not detect the disc within a predetermined time period set in the timer, the controller controls the disc-conveying unit so as to rotate the disc-conveying unit in the inserting direction, i.e., opposite to the ejecting direction. This conveys the disc back to the disc-holding position. Accordingly, the controller performs such a control operation for restarting the ejecting process.

Figure 7:
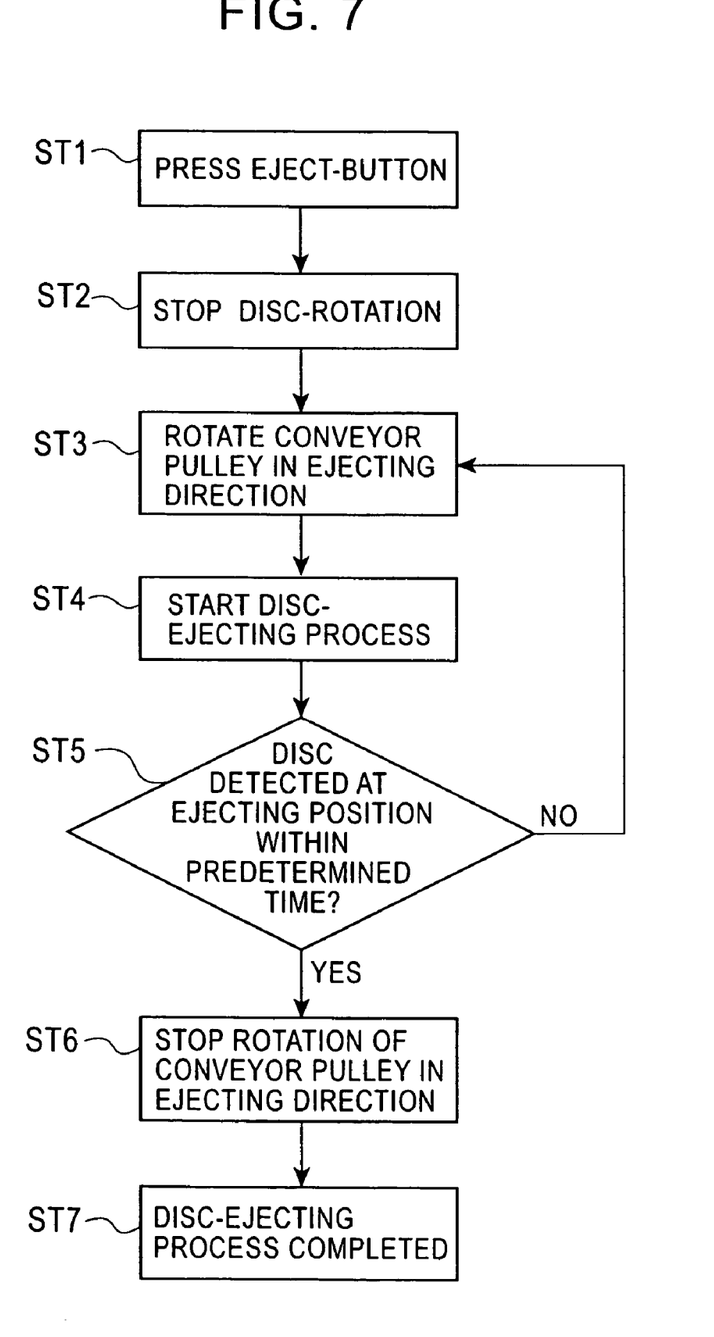
FIG. 7 is a flow chart illustrating an example of a conventional method for ejecting a disc.

FIG. 7 is a flow chart illustrating a retry operation performed by a disc-ejecting device of such a type. In the retry operation, when a user presses an eject button in step 1 (ST1) shown in FIG. 7, a disc in the process of a playback operation or a recording operation is stopped from rotating in step 2 (ST2).

Subsequently, in step 3 (ST3), the disc-conveying unit is rotated in the ejecting direction. This starts an ejecting process of the disc in step 4 (ST4).

In step 5 (ST5), it is determined whether the disc is detected at the disc-ejecting position within a predetermined time period set in the timer. If the detection of the disc is confirmed, the operation proceeds to step 6 (ST6), whereas if the detection is not confirmed, it is determined that an error has occurred in the ejecting process. In the latter case, the operation returns to step 3 (ST3). Although not shown in the drawing, before returning to step 3 (ST3), the disc-conveying unit is rotated in the inserting direction so that the disc is conveyed back to the disc-holding position.

In step 6 (ST6), the disc-conveying unit is stopped from rotating. Finally, the operation proceeds to step 7 (ST7) where the ejecting process of the disc is completed.

On the other hand, if the operation returns to step 3 (ST3) from step 5 (ST5), step 3 (ST3) and step 4 (ST4) are sequentially performed in order to repeat the ejecting process of the disc.

Accordingly, if an error occurs in the ejecting process of the disc in such a conventional method, the same steps in the ejecting process are repeated in order to recover from the error.

Such errors occurring in the ejection of discs are mainly due to, for example, rough edges present on discs and foreign matter attached to discs.

In other words, the rough-edged portions and unclean portions on the disc come into contact with mechanical components, such as the disc-conveying unit mentioned above, during the ejecting process, and thus interfere with the conveying process of the disc in the ejecting direction.

Figure 8:
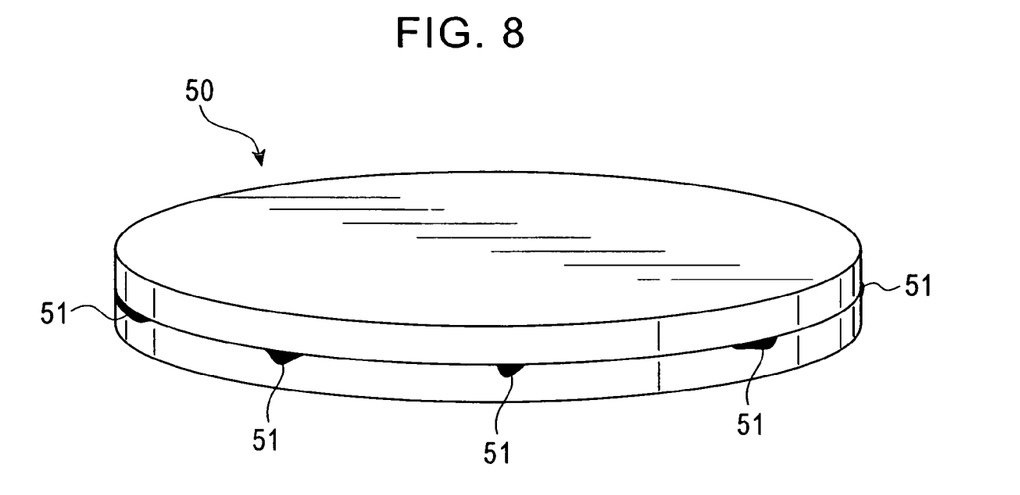
FIG. 8 is a perspective view of a laminated disc having rough-edged portions due to an adhesive, which is one of the causes of a disc-ejection error.

As shown in FIG. 8, especially when a disc 50 is a laminated type, such as a DVD, an adhesive 51 used for laminating together the disc-plate components protrudes outward from between the bonded surfaces of the disc-plate components. This forms rough-edged portions along the outer periphery of the laminated disc 50, and thus increases the probability of an occurrence of error in the ejecting process.

In the conventional disc-ejecting method, when an error occurs due to such rough-edged portions and foreign matter, the disc is simply re-conveyed in the ejecting direction by the disc-conveying unit for the retry operation. For this reason, the positional relationship between the mechanical components mentioned above and the rough-edged portions and unclean portions on the disc remain relatively unchanged. Therefore, it is very common that the error occurs over and over again.

Accordingly, it is considered that there are no effective conventional disc-ejecting methods that can properly recover from errors occurring in ejecting processes.

BRIEF SUMMARY

Accordingly, it is an object of the present invention to provide a method and a device for ejecting a disc, in which the positional relationship between rough-edged portions or unclean portions on a disc and mechanical components that come into contact with the disc are relatively changed when a retry operation for an ejecting process of the disc is performed so that the probability of an error reoccurring in the ejecting process can be reduced.

In order to achieve the above-mentioned object, the present invention provides a method for ejecting a disc from a disc apparatus in which the disc can be inserted into and ejected from the disc apparatus by a disc-conveying unit. Such a method includes the steps of starting an ejecting process of the disc by conveying the disc from at least a disc-holding position toward a disc-ejecting position by the disc-conveying unit, the disc-holding position corresponding to a rotator provided in the disc apparatus for rotating the disc, the disc-ejecting position corresponding to a position where the disc can be pulled outward from the disc apparatus; and conveying the disc back to the disc-holding position by the disc-conveying unit, rotating the disc by the rotator, and restarting the ejecting process of the disc if the disc is not detected at the disc-ejecting position within a predetermined time period from the start of the ejecting process.

According to this method, if an error occurs in the ejecting process of the disc, the disc is rotated by the rotator before restarting the ejecting process. This allows the positional relationship between the rough-edged portions or unclean portions on the disc and the mechanical components that come into contact with the disc during the ejecting process, such as the disc-conveying unit, to be relatively changed before restarting the ejecting process.

Furthermore, the present invention provides a disc-ejecting device which includes a disc-conveying unit for inserting a disc into a disc apparatus or ejecting a disc from a disc apparatus, the disc-conveying unit conveying the disc at least between a disc-holding position to a disc-ejecting position, the disc-holding position corresponding to a rotator provided in the disc apparatus for rotating the disc, the disc-ejecting position corresponding to a position where the disc can be pulled outward from the disc apparatus; a detector for detecting whether the disc is conveyed to the disc-ejecting position; and a controller. When an ejecting process of the disc is performed by conveying the disc from at least the disc-holding position toward the disc-ejecting position, if the detector does not detect the disc at the disc-ejecting position within a predetermined time period from the start of the ejecting process, the controller controls the disc-conveying unit so as to convey the disc back to the disc-holding position, and subsequently controls the rotator so that the rotator rotates the disc before restarting the ejecting process of the disc.

According to this structure, if an error occurs in the ejecting process of the disc, the controller controls the rotator so as to rotate the disc before restarting the ejecting process. This allows the positional relationship between the rough-edged portions or unclean portions on the disc and the mechanical components that come into contact with the disc during the ejecting process, such as the disc-conveying unit, to be relatively changed before restarting the ejecting process.

Furthermore, according to the disc-ejecting device of the present invention, the disc-conveying unit may include a conveyor pulley which rotates while being in contact with an outer periphery of the disc in order to convey the disc.

Accordingly, even if a laminated disc, such as a DVD, which is generally known for having rough-edged portions along the outer periphery due to adhesives, is conveyed by the conveyor pulley, the positional relationship between the rough-edged portions of the disc and the conveyor pulley can be relatively changed in order to prevent the rough-edged portions and the conveyor pulley from coming into contact with each other.

According to the disc-ejecting method of the present invention, the probability of an error reoccurring in the ejecting process of the disc can be reduced so as to achieve proper ejection of the disc.

When an error keeps repeating, there are cases where an alternative method, such as disassembling the disc apparatus, other than the usual method for ejecting the disc may need to be applied in order to take out the disc from the disc apparatus. This can possibly lead to damaging of the disc or the disc apparatus. However, such an alternative method is not necessary in the present invention since proper ejection of the disc is achieved. Accordingly, the disc-ejecting method of the present invention prevents the disc or the disc apparatus from being damaged, thus contributing to a longer life period of the products.

According to the disc-ejecting device of the present invention, the probability of an error reoccurring in the ejecting process of the disc can be reduced so as to achieve proper ejection of the disc. Moreover, the disc-ejecting device protects the disc and the disc apparatus from damage.

Furthermore, according to the disc-ejecting device of the present invention, the rate of occurrence of errors in the ejecting process, which is especially high when using laminated discs such as DVDs, can be effectively reduced.

DETAILED DESCRIPTION OF THE DRAWINGS AND THE PRESENTLY PREFERRED EMBODIMENTS

Embodiments of the present invention will now be described with reference to the drawings. A disc-ejecting device 1 according to a first embodiment of the present invention and a disc apparatus 2 provided with the disc-ejecting device 1 will be described with reference to FIGS. 1 to 5.

Figure 2:
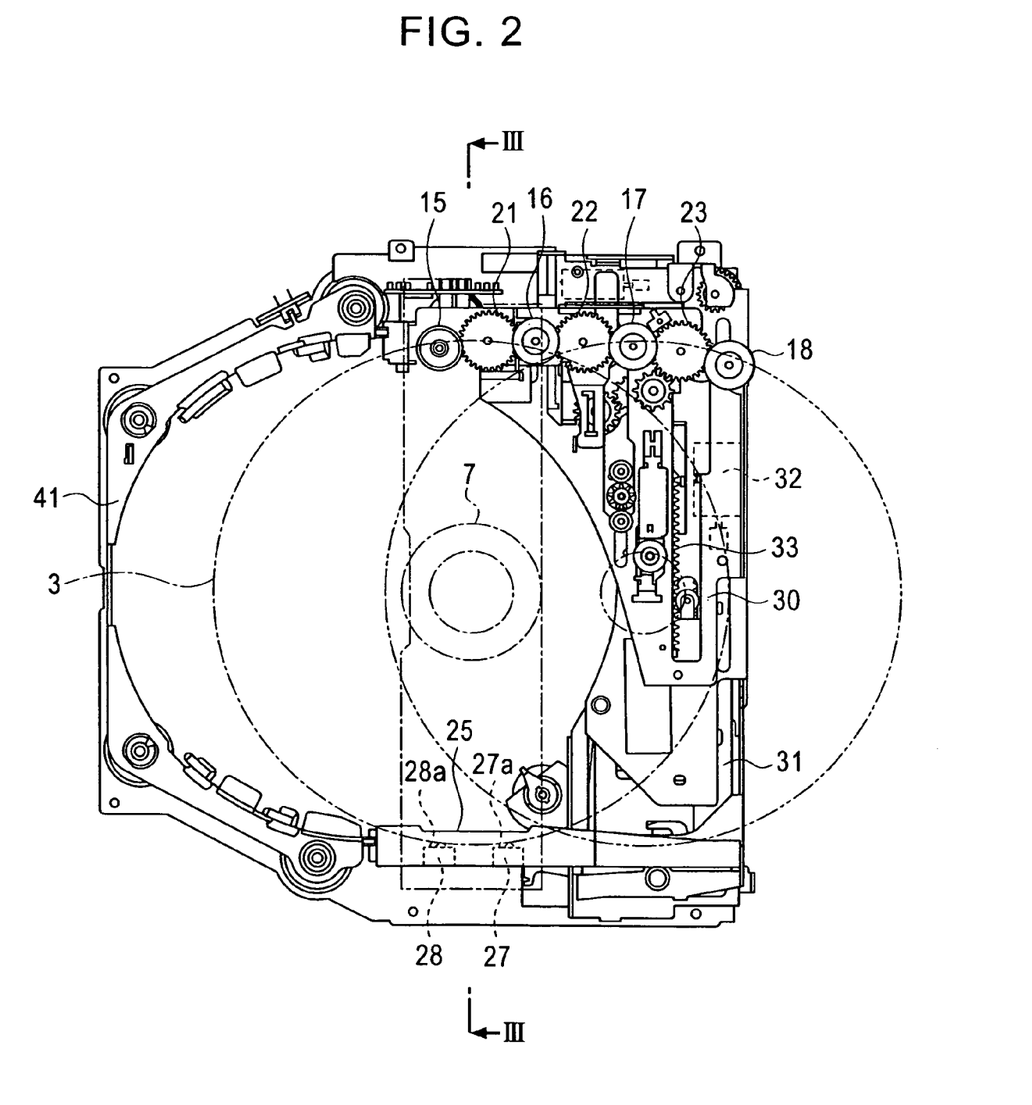
FIG. 2 is a plan view of FIG. 1.
Figure 3:
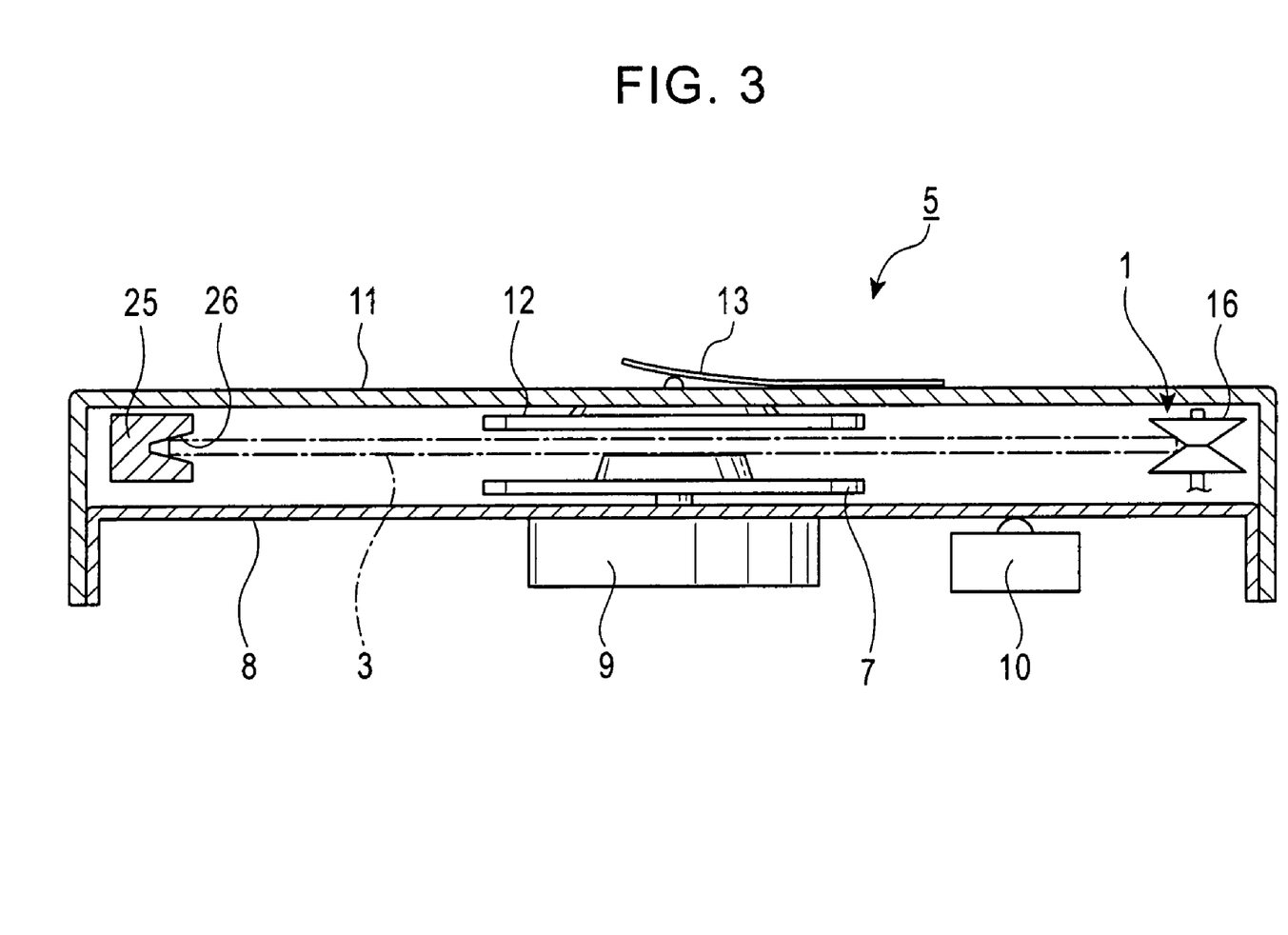
FIG. 3 is a cross-sectional view taken along line III-III in FIG. 2.
Figure 4:
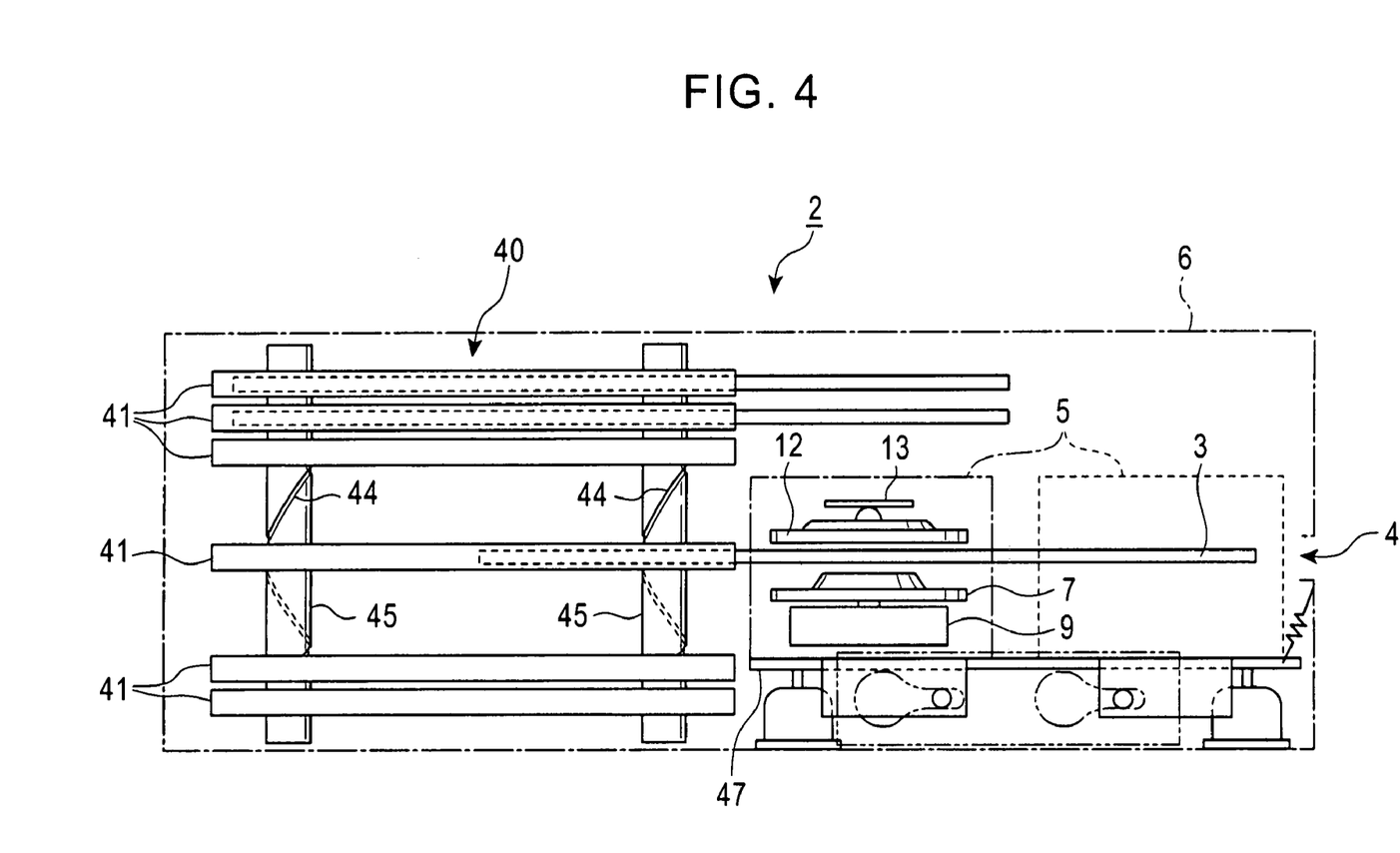
FIG. 4 is a schematic side view illustrating the disc apparatus provided with the disc-ejecting device according to the first embodiment of the present invention.

FIGS. 1 to 4 illustrate the disc apparatus 2 provided with the disc-ejecting device 1 according to the present invention. As shown in FIG. 4, the disc apparatus 2 includes a casing 6 provided with an opening 4 through which a disc 3 can be inserted, and a driving unit 5. The driving unit 5 is provided with a turntable 7 defining a rotator for rotating the disc 3.

Referring to FIGS. 3 and 4, the driving unit 5 is further provided with a driving chassis 8 which is disposed below the turntable 7 and parallel to the turntable 7. The undersurface of the driving chassis 8 is provided with a driving source 9, such as a spindle motor, for rotating the turntable 7.

Furthermore, an optical head 10 is disposed below the driving chassis 8. The optical head 10 has an objective lens from which an optical beam for playback or recording is emitted. The optical beam passes through a slit provided in the driving chassis 8, which is not shown in the drawings, and becomes incident on the recording surface of the disc 3 disposed on the turntable 7 such that a playback operation or a recording operation is performed with respect to the disc 3.

Referring to FIG. 3, the driving unit 5 is further provided with a clamping chassis 11 which faces the driving chassis 8. The clamping chassis 11 is disposed above and in parallel with the driving chassis 8 such that the clamping chassis 11 and the driving chassis 8 have the turntable 7 disposed therebetween. The clamping chassis 11 is movable toward and away from the driving chassis 8 in response to a driving force of a clamp driver, which is not shown in the drawings.

The clamping chassis 11 rotatably supports a damper 12. The damper 12 is biased towards the turntable 7 by a biasing member 13, such as a leaf spring. The biasing force of the biasing member 13 presses the clamper 12 against the disc 3 disposed on the turntable 7, i.e., a disc-holding position, so as to maintain the disc 3 on the turntable 7.

The damper 12 is pressed against the disc 3 when the clamping chassis 11 is positioned close to the driving chassis 8. Such a pressing force of the damper 12 against the disc 3 is released as the clamping chassis 11 moves away from the driving chassis 8.

The turntable 7 and the opening 4 for the disc 3 have a disc-conveying unit disposed therebetween for conveying the disc 3. By using a rotational force, the disc-conveying unit is capable of conveying the disc 3 at least between the disc-holding position on the turntable 7 and a disc-ejecting position. Specifically, when the disc 3 is set at the disc-ejecting position, at least a portion of the disc 3 is exposed from the disc apparatus 2 through the opening 4 so that a user can pull the disc 3 outward from the disc apparatus 2.

Figure 1:
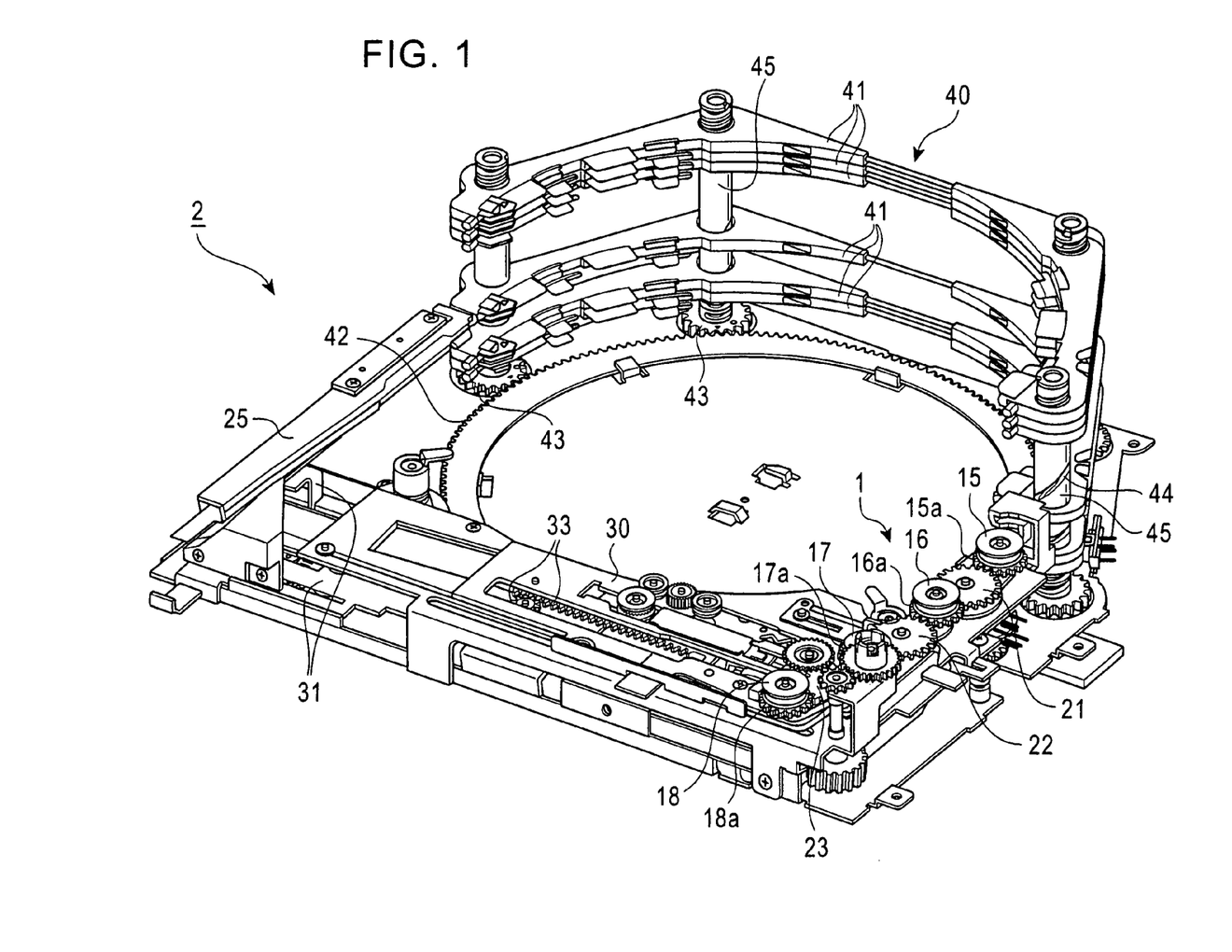
FIG. 1 is a schematic perspective view illustrating a disc apparatus provided with a disc-ejecting device according to a first embodiment of the present invention.

In the first embodiment, the disc-conveying unit includes a plurality of conveyor pulleys, namely, four conveyor pulleys 15, 16, 17, and 18 in FIG. 1, arranged at a predetermined interval in the conveying direction of the disc 3. Rotary shafts of the conveyor pulleys 15, 16, 17, and 18 and a rotary shaft for rotating the disc 3 set on the turntable 7 are disposed parallel to one another.

Referring to FIG. 3, each of the conveyor pulleys 15, 16, 17, and 18 is vertically double-tapered in cross-section such that the conveyor pulley becomes narrower from its upper and lower portions towards its central portion. The upper and lower tapered segments of each conveyor pulley form a V-shaped groove in which the outer periphery of the disc 3 is maintained.

Figure 5:
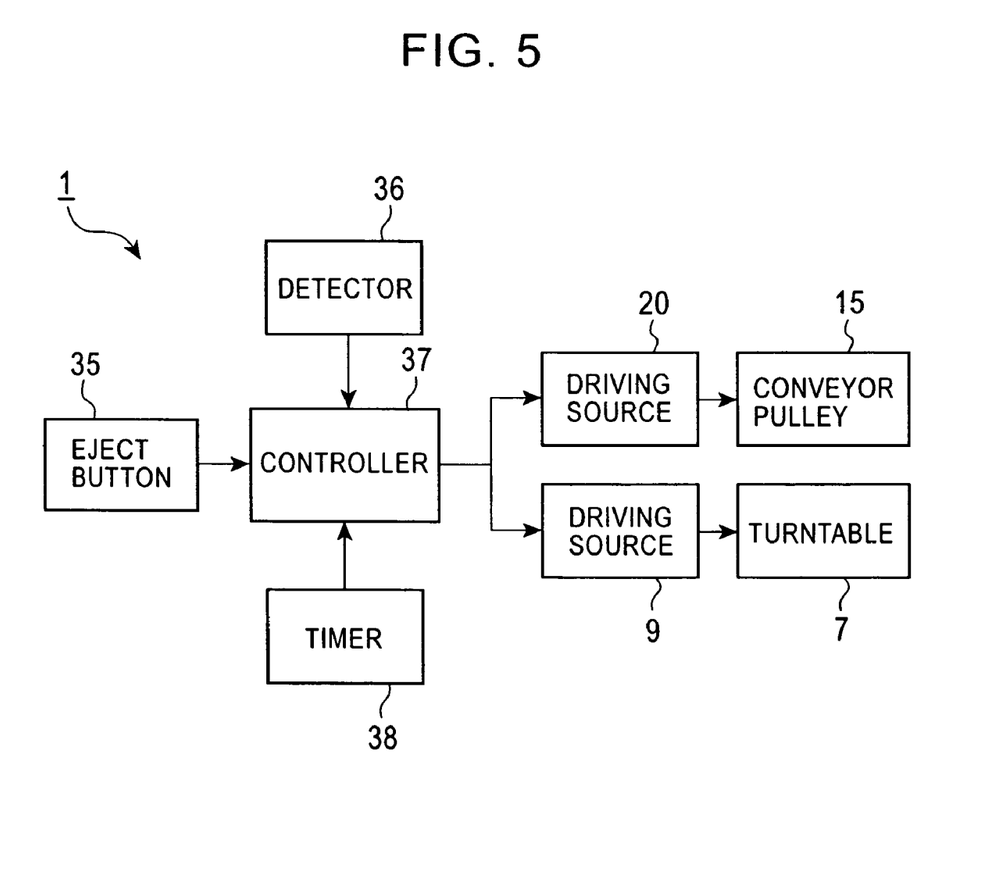
FIG. 5 is a block diagram illustrating the disc-ejecting device according to the first embodiment of the present invention.

Referring to FIG. 5, the conveyor pulley 15 is linked with a driving source 20, such as a motor, in a directly-linked fashion or by a transmission mechanism, such as a reduction gear. Referring to FIG. 1, the driving force of the driving source 20 is transmitted to the remaining conveyor pulleys 16, 17, and 18 by gears 15a, 16a, 17a, and 18a coaxially fixed to the respective conveyor pulleys 15, 16, 17, and 18, and by transmission gears 21, 22, and 23 meshed with and disposed between the corresponding gears 15a, 16a, 17a, and 18a.

Accordingly, the conveyor pulleys 15, 16, 17, and 18 can be rotated simultaneously in the same direction, namely, in the inserting direction for conveying the disc 3 into the disc apparatus 2 or in the ejecting direction for conveying the disc 3 to the disc-ejecting position.

Referring to FIG. 1, an elongated guide member 25 is disposed in the casing 6 such that the guide member 25 extends longitudinally in the conveying direction of the disc 3. Specifically, the guide member 25 and the group of arranged conveyor pulleys 15, 16, 17, and 18 face each other across the disc 3 in a width direction, which is a direction perpendicular to the conveying direction of the disc 3.

Referring to FIG. 3, the guide member 25 is provided with a long guiding groove 26 extending in the longitudinal direction of the guide member 25. The guiding groove 26 is disposed at a position in the guide member 25 where the disc 3 engages with the guide member 25. The outer periphery of the disc 3 slides along the guiding groove 26 so that the disc 3 can be conveyed in a stable manner.

Referring to FIG. 2, the guide member 25 is further provided with a first detector 27 and a second detector 28 disposed at positions on the guide member 25 corresponding to the position where the disc 3 engages with the turntable 7. The first detector 27 and the second detector 28 are separated from each other by a predetermined distance in the conveying direction of the disc 3 and are used for detecting that the disc 3 is set on the turntable 7. Furthermore, the first detector 27 and the second detector 28 are respectively provided with actuators 27a and 28a projecting from the guiding groove 26 of the guide member 25. When the outer periphery of the disc 3 presses against the actuators 27a and 28a of the respective detectors 27 and 28 during the disc-inserting process, the detectors 27 and 28 are switched to an ON state. Thus, the disc 3 is detected when it is set on the turntable 7.

Referring to FIGS. 1 and 2, the conveyor pulleys 15, 16, 17, and 18 are fixed on a first movable member 30, and the guide member 25 is fixed on a second movable member 31. The first movable member 30 and the second movable member 31 are movable toward and away from each other in the width direction by receiving a driving force of a driving source 32, such as a motor, through a transmission mechanism 33, such as a gear or a rack.

Consequently, depending on the radius of the disc 3 to be conveyed by the group of conveyor pulleys 15, 16, 17, and 18, the space between the group of conveyor pulleys 15, 16, 17, and 18 and the guide member 25 can be adjusted.

Referring to FIG. 5, the disc-ejecting device 1 according to the first embodiment includes an eject button 35. When the eject button 35 is pressed by a user, a command signal for ejecting the disc 3 is sent to the disc-ejecting device 1.

The disc-ejecting device 1 according to the first embodiment further includes a detector 36, such as an optical sensor. The detector 36 is used for detecting whether the disc 3 has been conveyed to the disc-ejecting position in the ejecting process of the disc 3.

The disc-ejecting device 1 according to the first embodiment also includes a controller 37 for controlling a retry operation for disc ejection. The controller 37 is electrically connected with the eject button 35; the driving source 20 for the conveyor pulleys 15, 16, 17, and 18; the driving source 9 for the turntable 7; the detector 36; the first and second detectors 27 and 28; and a timer 38 for measuring the elapsed time from the start of the ejecting process. The controller 37 controls these components in order to perform the retry operation.

More specifically, when the controller 37 detects an electric signal indicating that the eject button 35 has been pressed, the controller 37 provides a control signal to the driving source 20 for the conveyor pulleys 15, 16, 17, and 18 so that the driving source 20 rotates the conveyor pulleys 15, 16, 17, and 18 in the ejecting direction. This starts the ejecting process of the disc 3.

Subsequently, if the controller 37 does not receive a detection signal from the detector 36 within a time period from the start of the ejecting process of the disc 3 to a predetermined time lapse set in the timer 38, the controller 37 determines that an error has occurred in the ejecting process. If such an ejection error occurs, the controller 37 provides a control signal to the driving source 20 for the conveyor pulleys 15, 16, 17, and 18 so that the driving source 20 rotates the conveyor pulleys 15, 16, 17, and 18 in the inserting direction, i.e., opposite to the ejecting direction. This allows the disc 3 to be conveyed back to the disc-holding position on the turntable 7.

When the controller 37 receives an electric signal from the first detector 27 and the second detector 28 indicating that the disc 3 has been set at the disc-holding position again, the controller 37 provides a control signal to the driving source 9 so as to rotate the turntable 7. Consequently, the turntable 7 is rotated.

Thus, the disc 3 set on the turntable 7 is rotated such that the positional relationship between the rough-edged portions and/or unclean portions on the disc 3 and the mechanical components that come into contact with the disc 3 during the ejecting process, such as the conveyor pulleys 15, 16, 17, and 18 and the guide member 25, can be relatively changed. The amount of rotation of the disc 3 in this case may be adjusted in a desired manner according to need.

After the rotation of the disc 3, the controller 37 provides a control signal to the driving source 20 for the conveyor pulleys 15, 16, 17, and 18 again so that the driving source 20 rotates the conveyor pulleys 15, 16, 17, and 18 in the ejecting direction. Consequently, the retry operation for re-ejecting the disc 3 is performed.

Referring to FIGS. 1 and 4, in addition to the above-mentioned components, the disc apparatus 2 is further provided with a storing unit 40. The storing unit 40 is disposed near the turntable 7 and at a side opposite to where the conveyor pulleys 15, 16, 17, and 18 are disposed. The storing unit 40 allows multiple discs 3 to be stored inside the disc apparatus 2. The storing unit 40 includes a plurality of disc holders 41 which are stacked one on top of the other vertically, such that each disc holder 41 is capable of holding the outer periphery of a corresponding disc 3.

Furthermore, the casing 6 includes guiding columns 45 standing vertically in a rotatable manner. The outer periphery of each guiding column 45 has a spiral groove 44. Thus, the disc holders 41 and the guiding columns 45 engage with each other via the spiral grooves 44. Moreover, the lower portion of each guiding column 45 is provided with a small-diameter gear 43.

The small-diameter gears 43 are meshed with a large-diameter gear 42 which is linked with a driving source, such as a motor. The disc holders 41 receive a driving force from the driving source through the large-diameter gear 42, the small-diameter gears 43, and the guiding columns 45 such that the disc holders 41 are movable vertically along the guiding columns 45.

Accordingly, by selecting a desired disc 3 held by the corresponding disc holder 41, the selected disc 3 and the disc holder 41 are shifted to the same height as the turntable 7.

The disc 3 set at the same height as the turntable 7 is conveyed to the turntable 7 by the conveyor pulleys 15, 16, 17, and 18. This allows the optical head 10 to perform a playback operation or a recording operation with respect to the selected disc 3.

On the other hand, referring to FIG. 4, the driving unit 5 is supported by a supporting chassis 47. The driving unit 5 is movable together with the supporting chassis 47 in the conveying direction through the driving force of the driving source, such as a motor, such that the driving unit 5 and the supporting chassis 47 are prevented from interfering with the vertical movement of the disc holders 41. The dot-dashed line in FIG. 4 indicates the position of the driving unit 5 where a playback operation or a recording operation is performed with respect to the disc 3, whereas the dotted line indicates a withdrawn position of the driving unit 5 in which the driving unit 5 is prevented from coming into contact with the disc holders 41 when the disc holders 41 are moving in the vertical direction.

Furthermore, the disc 3 can be conveyed directly from the storing unit 40 to the disc-ejecting position with the conveyor pulleys 15, 16, 17, and 18.

A method for ejecting a disc according to a second embodiment of the present invention will now be described with reference to FIG. 6.

In the second embodiment, if an error occurs in the disc-ejecting process, the disc-conveying unit conveys the disc back to the disc-holding position on the rotator before the retry operation for re-ejecting the disc is performed.

The second embodiment is distinctive in that a control operation for rotating the disc with the rotator is performed prior to the retry operation.

Figure 6:
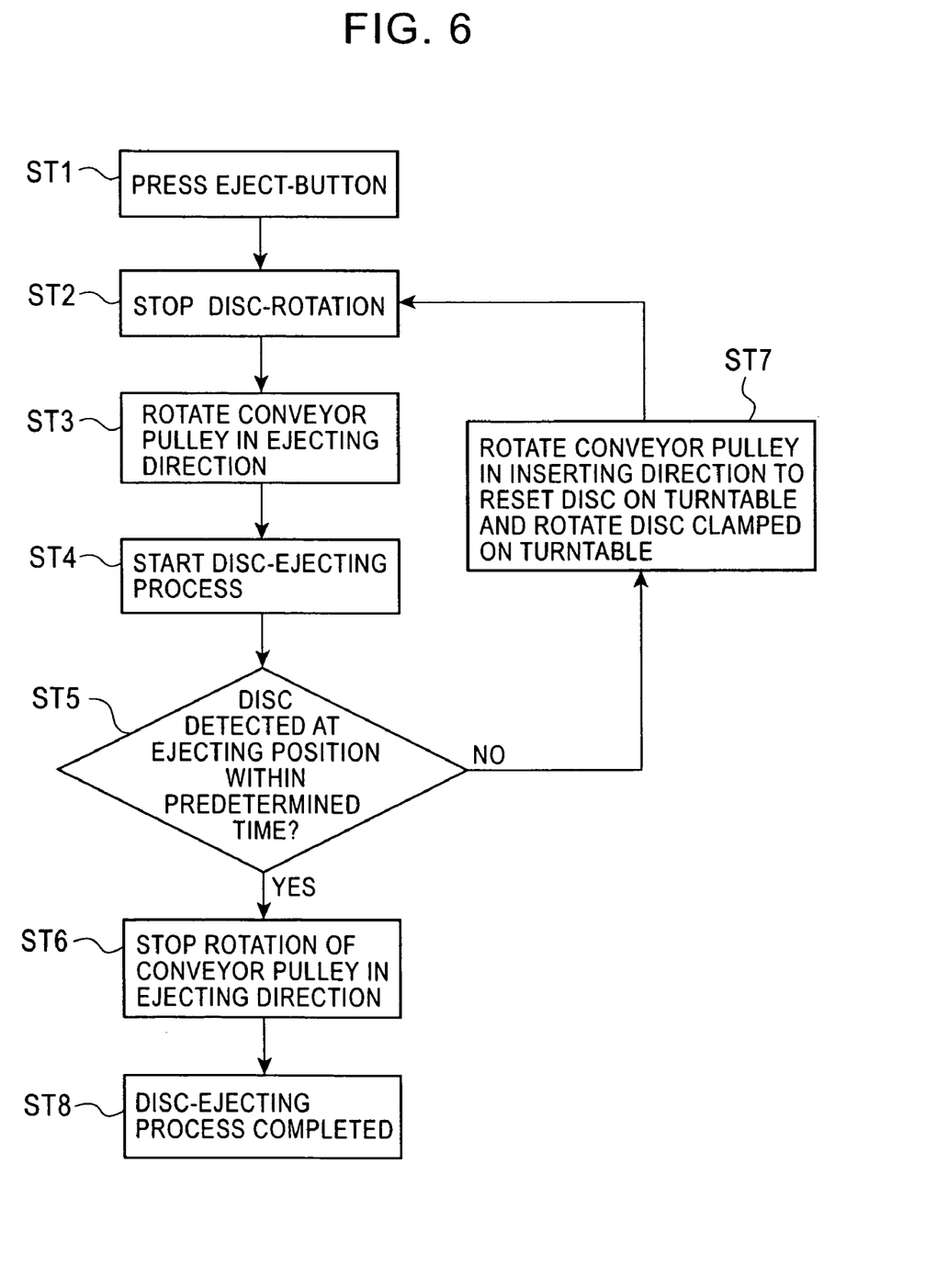
FIG. 6 is a flow chart illustrating a method for ejecting a disc according to a second embodiment of the present invention.

FIG. 6 is a flow chart illustrating the method for ejecting a disc according to the second embodiment. Specifically, when a user presses the eject button 35 of the disc-ejecting device 1 in step 1 (ST1), the turntable 7 defining the rotator in the disc apparatus 2 stops rotating the disc 3 in step 2 (ST2).

Subsequently, in step 3 (ST3), the conveyor pulleys 15, 16, 17, and 18 defining the disc-conveying unit are rotated in the ejecting direction. This starts the ejecting process of the disc 3 in step 4 (ST4).

In step 5 (ST5), it is determined whether the disc 3 is detected by the detector 36 at the disc-ejecting position within a predetermined time period set in the timer 38. If the detection of the disc 3 is confirmed, the operation proceeds to step 6 (ST6), whereas if the detection is not confirmed, it is determined that an error has occurred in the ejecting process. In the latter case, the operation proceeds to step 7 (ST7).

In step 6 (ST6), the conveyor pulleys 15, 16, 17, and 18 are stopped from rotating in the ejecting direction. The operation then proceeds to step 8 (ST8) where the ejecting process of the disc 3 is completed.

On the other hand, in step 7 (ST7), the conveyor pulleys 15, 16, 17, and 18 are rotated in the inserting direction, i.e., opposite to the ejecting direction, so that the disc 3 is conveyed back to the disc-holding position on the turntable 7 and is clamped onto the turntable 7 by the damper 12. When it is confirmed that the disc 3 is securely clamped on the turntable 7 by, for example, detection by a chucking end, the turntable 7 rotates the disc 3.

After step 7, the operation returns to step 2 (ST2) where the disc 3 is stopped from rotating. Subsequently, the ejecting process of the disc 3 is performed again in step 3 (ST3) and step 4 (ST4).

The rotation of the disc 3 in step 7 (ST7) allows the positional relationship between the rough-edged portions and unclean portions on the disc 3 and the mechanical components that come into contact with the disc 3 during the ejecting process, such as the conveyor pulleys 15, 16, 17, and 18 and the guide member 25, to be relatively changed. This reduces the probability of the rough-edged portions or unclean portions coming into contact with the mechanical components again.

Accordingly, the probability of an error reoccurring in the ejecting process can be reduced so as to achieve a proper ejecting process of the disc 3.

The disc 3 set at the disc-ejecting position may be pulled outward from the disc apparatus 2 manually by a user.

The technical scope of the present invention is not limited to the above embodiments, and modifications are permissible within the scope and spirit of the present invention.

For example, although the conveyor pulleys 15, 16, 17, and 18 in contact with the outer periphery of the disc 3 are used as the disc-conveying unit in the above embodiments, the present invention is not limited to such components. Alternatively, a conveying roller may be used in place of the conveyor pulleys 15, 16, 17, and 18 such that the conveying roller conveys the disc 3 while being in contact with the recording face of the disc 3 or the face opposite the recording face.

Furthermore, the present invention applies to a case where the storing unit 40 is set as the initial position in the ejecting process of the disc 3. In this case, the same advantages as provided by the above embodiments can be achieved.

The invention claimed is:

1. A method for ejecting a disc from a disc apparatus in which the disc can be inserted into and ejected from the disc apparatus via a disc-conveying unit, the method comprising:
   starting an ejecting process of the disc by conveying the disc from at least a disc-holding position toward a disc-ejecting position by the disc-conveying unit, the disc-holding position corresponding to a rotator provided in the disc apparatus for rotating the disc, the disc-ejecting position corresponding to a position where the disc can be pulled outward from the disc apparatus; and
   conveying the disc back to the disc-holding position by the disc-conveying unit, rotating the disc by the rotator, and restarting the ejecting process of the disc if the disc is not detected at the disc-ejecting position within a predetermined time period from the start of the ejecting process.

2. A disc-ejecting device comprising:
   a disc-conveying unit for inserting a disc into a disc apparatus or ejecting a disc from a disc apparatus, the disc-conveying unit conveying the disc at least between a disc-holding position and a disc-ejecting position, the disc-holding position corresponding to a rotator provided in the disc apparatus for rotating the disc, the disc-ejecting position corresponding to a position where the disc can be pulled outward from the disc apparatus;
   a detector for detecting whether the disc is conveyed to the disc-ejecting position; and
   a controller,
   wherein when an ejecting process of the disc is performed by conveying the disc from at least the disc-holding position toward the disc-ejecting position, if the detector does not detect the disc at the disc-ejecting position within a predetermined time period from the start of the ejecting process, the controller controls the disc-conveying unit so as to convey the disc back to the disc-holding position, and subsequently controls the rotator so that the rotator rotates the disc before restarting the ejecting process of the disc.

3. The disc-ejecting device according to claim 2, wherein the disc-conveying unit comprises a conveyor pulley which rotates while being in contact with an outer periphery of the disc in order to convey the disc.

4. The disc-ejecting device according to claim 2, wherein the disc-conveying unit comprises a conveying roller which rotates while being in contact with a recording face of the disc or a face of the disc opposite the recording face in order to convey the disc.

5. The disc-ejecting device according to claim 2, wherein the disc apparatus is a disc-changeable disc apparatus provided with a disc-storing unit for storing a plurality of discs inside the apparatus.

6. The disc-ejecting device according to claim 5, wherein the disc-conveying unit is capable of conveying a selected one of the plurality of discs stored in the disc-storing unit between a corresponding disc-storing position in the disc-storing unit and the disc-holding position on the rotator.

7. A disc apparatus comprising:
   an opening through which a disc is inserted into and ejected from the disc apparatus;
   a rotator for rotating the disc;
   a disc-conveying unit for conveying the disc between the rotator and the opening;
   a detector for detecting whether the disc is conveyed to a disc-ejecting position corresponding to the opening, the disc-ejecting position corresponding to a position where the disc can be pulled outward from the disc apparatus; and
   a controller,
   wherein when an ejecting process of the disc is performed by conveying the disc from at least a disc-holding position corresponding to the rotator toward the disc-ejecting position, if the detector does not detect the disc at the disc-ejecting position within a predetermined time period from the start of the ejecting process, the controller controls the disc-conveying unit so as to convey the disc back to the disc-holding position, and subsequently controls the rotator so that the rotator rotates the disc before restarting the ejecting process of the disc.

8. The disc apparatus according to claim 7, wherein the disc apparatus is a disc-changeable disc apparatus provided with a disc-storing unit for storing a plurality of discs inside the apparatus.

9. The disc apparatus according to claim 8, wherein the disc-conveying unit is capable of conveying a selected one of the plurality of discs stored in the disc-storing unit between a corresponding disc-storing position in the disc-storing unit and the disc-holding position on the rotator.

10. The disc apparatus according to claim 9, wherein when the ejecting process is performed by conveying one of the plurality of discs stored in the disc-storing unit toward the disc-ejecting position, if the detector does not detect the disc at the disc-ejecting position within the predetermined time period from the start of the ejecting process, the controller controls the disc-conveying unit so as to convey the disc to the disc-holding position corresponding to the rotator, and subsequently controls the rotator so that the rotator rotates the disc before restarting the ejecting process of the disc.

* * * * *